Patented Oct. 20, 1931

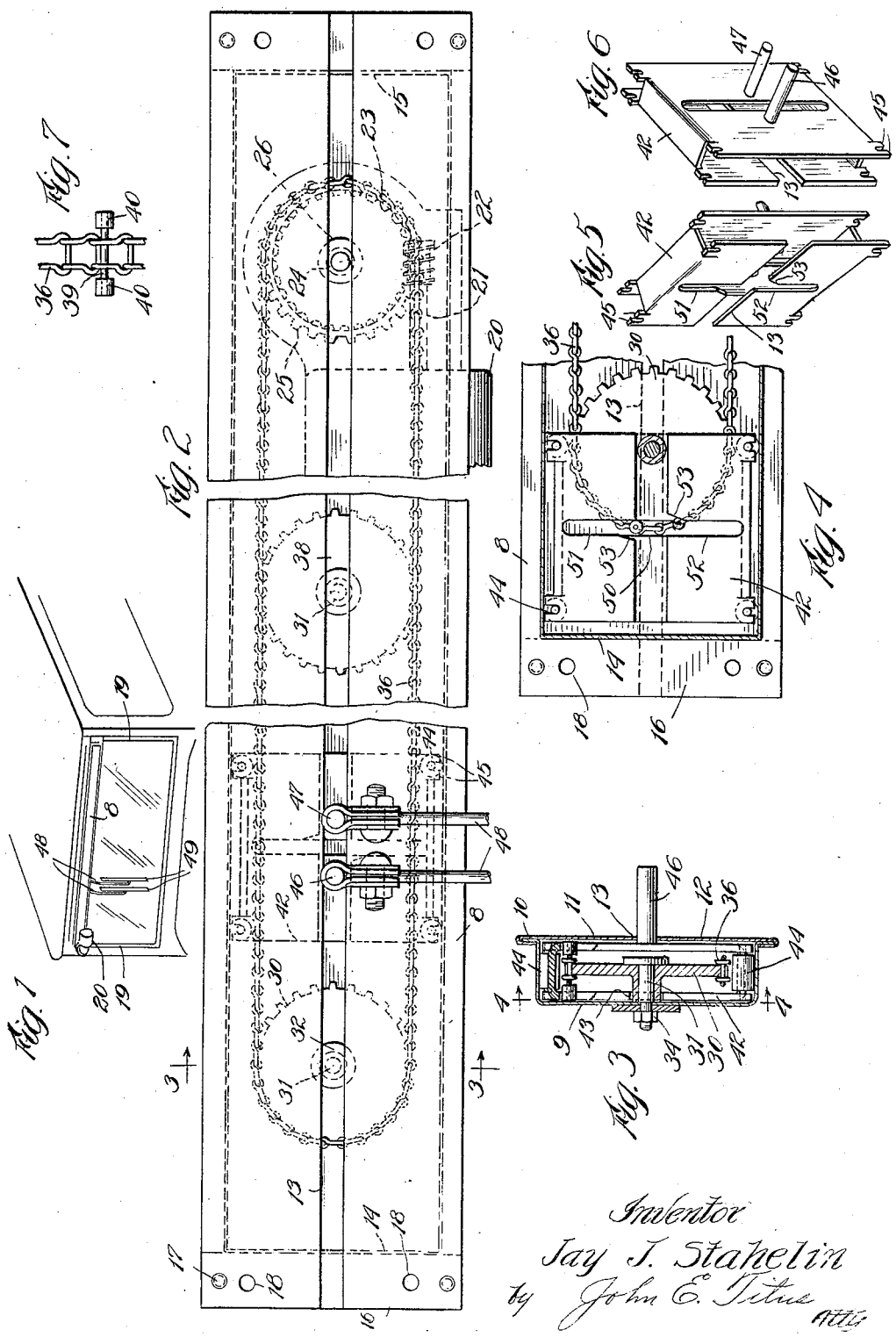

1,827,959

UNITED STATES PATENT OFFICE

JAY J. STAHELIN, OF CHICAGO, ILLINOIS

WINDSHIELD WIPER

Application filed November 29, 1929. Serial No. 410,390.

This invention relates to windshield wipers, and has for its objects to provide a wiper which can be operated completely across the windshield; to provide such a device which is positive in its action and simple in construction so that it is not likely to get out of order and can be manufactured economically; to provide a firm support for the wiper blade; and to provide a device which works easily with little friction, and which can be operated by a small, low voltage motor.

Heretofore it has been found difficult to provide a windshield wiper which would operate completely across the shield because of the extreme length of the stroke and the necessity of moving the wipers close up to the supports at each end. Vacuum systems have been found objectionable on account of their liability to stick and the interference with the flow of the gas charges into the engine cylinders; and the mechanical, electric motor operated devices were too expensive, cumbersome, and likely to get out of order. This was mainly due to the complicated or delicate reversing mechanism, whether a double-threaded worm was used or an endless chain.

In my invention I use a C-sectioned housing with a slot or aperture, through which the connections to the wiper blades are made, at the back. The housing is mounted close to the glass and at the top of the windshield under the visor, so that the wiper mechanism is well protected from the weather.

A chain belt is mounted on sprockets which run on stub shafts mounted in the front wall of the housing, and I employ a C-sectioned traveler which passes over the hubs of the sprocket and is engaged with the chain on each side so that the lateral pull is equalized. The traveler has vertical slots in which are engaged pins projecting laterally from the chain.

The objects and advantages of my invention will be more fully understood from the following description with reference to the accompanying drawings, in which:

Fig. 1 is a fragmental perspective view of the front of an automotive vehicle having a windshield wiper made according to my invention attached thereto.

Fig. 2 is a rear elevation of the wiper, with portions broken away.

Fig. 3 is a section on the line 3—3 of Fig. 2.

Fig. 4 is a section of the left end of the device looking from the front, showing the parts at the reversal period, and is taken on the line 4—4 of Fig. 3.

Fig. 5 is a perspective view showing the front of the traveler or wiper carrier.

Fig. 6 is a perspective view of the same, showing the rear.

Fig. 7 is a detail view of a portion of the chain belt.

I provide a substantially C-shaped housing 8 which is built up of the channel-shaped sheet-metal front member 9 which has outwardly projecting flanges 10 formed on the inner ends at the top and bottom sides, and the strips 11 and 12 at the rear, which are bent over at the edges to engage the flanges 10, the width of the strips being such that a narrow slot or aperture 13 is left in the middle. The front member 9 is bent in to form the end walls 14, 15, and the flange portions 10 are connected and reinforced by the end plates 16, the strips and plates being fastened together by the rivets 17. Suitable holes 18 are provided in the plates for screws for mounting the housing on the frame 19 of the windshield.

The driving motor 20 is mounted on the outer surface of the housing 8 at the end which is at the right side of the vehicle when the wiper is in position; and the motor is connected to the electrical storage or generating system of the vehicle. The motor shaft 21 has fixed thereon a worm 22 which meshes with a gear 23 mounted on the shaft 24. The shaft 24 is rotatably mounted in the motor frame and projects through the front wall. Fixed on the inner end of tht motor shaft is a sprocket wheel 25, the wheel being positioned in about the middle of the housing, and having a hub 26 only on the one side, leaving the space between the sprocket and the plates 11 and 12 unobstructed.

In the end of the housing and also on the front wall is mounted the sprocket wheel 30, the wheel 30 being rotatable on the stub shaft 31, which has a flange on its inner end to retain the sprocket and is shouldered down where it passes through the wall and is secured in place by the nut 34. Mounted on the sprockets 25 and 30 is an endless chain belt 36, and suitable supporting brackets 38, mounted in the same manner as the idler sprocket 30, may be supplied for supporting the intermediate portions of the chain. In the loops of one of the links of the chain is inserted a steel pin 39, on the ends of which are fixed brass tubular enlargements 40 for the purpose of furnishing larger bearing surfaces.

Slidably mounted in the housing is a traveler or wiper carriage 42, which is also substantially C-shaped and faced forwardly so that the aperture 43 will pass over the hubs of the sprockets. The traveler is stamped out of one piece of sheet-metal, and may be provided with friction rollers 44 engaged in suitable lugs 45 formed up at the corners.

Both sides of the traveler are slotted transversely to the direction of travel to receive the pin members 40, and in the back of the traveler are mounted the pins 46, 47, which project through the housing slot 13 and to which are attached the stems 48 of the wiper blades 49.

The transverse slot 50 in the rear of the traveler, of course, extends completely across, while the slots 51, 52 at the front terminate at the aperture 43. This leaves the pin 40 at the rear side of the chain unguided while the pin is moving across the middle of the traveler during the reversal period. Therefore, in order to insure the entry of the pin into the opposite slot, it becomes necessary to chamfer the corner 53, as can be seen in Fig. 4.

The traveler or carriage 42 furnishes a positive support for the wiper blades parallel to the direction of movement and also transverse to the same, so that the wipers can be made to bear firmly against the glass.

The traveler cannot become disengaged from the chain at the ends because one pin is always in the continuous slot, and the traveler is gradually brought to rest and reversed with considerable available power that prevents sticking at the ends of the motion. Also the mechanism is well protected from the sleet and snow, and oil or grease can be carried in the house to insure proper lubrication and prevent rust.

Having thus described my invention, my claims are:

1. A C-shaped traveler or wiper carriage having a longitudinal slot in one side, and transverse slots in both sides.

2. The combination of a C-section housing, a C-section traveler slidable in the housing and having pins in the back projecting through the aperture in the housing, and means for engaging the traveler for reciprocating the same.

3. In a mechanism of the class described, a C-sectioned housing, a sprocket rotatably mounted in the closed side at each end of the housing and carrying an endless chain having projecting pins, a C-sectioned traveler slidably mounted in the housing so that the hub of the sprocket will pass through the aperture, the traveler being slotted vertically or transversely to its movement to receive the pin, and a pin attached to the traveler and projecting through the aperture in the housing.

4. In a mechanism of the class described, a rectangular sectioned housing mounted across the windshield, the rear wall of the housing having a longitudinal aperture or slot, a sprocket rotatably mounted on the front wall at each end of the housing, an endless chain mounted on the sprockets and having a pin projecting at each side thereof, a traveler slidably supported in the housing and embracing the chain, the traveler having transverse slots in both sides thereof for receiving the pins and a horizontal slot extending through the front side for passing over the hubs of the sprockets, and a pin mounted on the rear side of the traveler and projecting through said longitudinal aperture.

Signed at Chicago, Illinois, this 26 day of Nov., 1929.

JAY J. STAHELIN.